United States Patent [19]
Peters

[11] 3,844,642
[45] Oct. 29, 1974

[54] MICROFILM VIEWER
[75] Inventor: Arnis E. Peters, La Crosse, Wis.
[73] Assignee: Gelatt Investments, Inc, La Crosse, Wis.
[22] Filed: Oct. 16, 1972
[21] Appl. No.: 297,690

Related U.S. Application Data
[62] Division of Ser. No. 90,514, Nov. 18, 1970.

[52] U.S. Cl. ............... 352/78 R, 352/224, 353/26
[51] Int. Cl. .......................................... G03b 23/02
[58] Field of Search ......... 352/72, 77, 78, 224, 129, 352/156; 355/75; 353/26; 242/198, 199, 200

[56] References Cited
UNITED STATES PATENTS

| | | | |
|---|---|---|---|
| 3,245,746 | 4/1966 | Mast et al. | 352/78 R X |
| 3,271,099 | 9/1966 | Debrie | 352/224 |
| 3,498,707 | 3/1970 | Allen | 353/26 |
| 3,523,657 | 8/1970 | Hearon et al. | 242/200 |
| 3,601,335 | 2/1970 | Dopkins | 352/72 X |
| 3,625,602 | 12/1971 | Grandall | 352/224 X |
| 3,679,298 | 7/1972 | Knowles | 353/26 |
| 3,692,398 | 9/1972 | Strauss | 353/78 X |

FOREIGN PATENTS OR APPLICATIONS

| | | | |
|---|---|---|---|
| 884,192 | 8/1943 | France | 352/224 |
| 131,708 | 8/1932 | Austria | 352/224 |

Primary Examiner—Samuel S. Matthews
Assistant Examiner—Alan Mathews
Attorney, Agent, or Firm—Norman Lettvin

[57] ABSTRACT

A portable, compact viewer is provided for illuminating, enlarging and viewing microphotograph frames that are carried on a film strip pre-packaged in a cassette. An angled stand for the viewer carries one of the mirrors used in projecting the illuminated and enlarged image and provides shield means against random light entering the viewer. Simplified means are provided for selectively holding a film-containing cassette in proper optical position on the viewer and for releasing the cassette for focusing the lens means and for transporting the film in the cassette selectively in opposite directions, all without possibility of damage to the microphotograph-bearing portion of the film strip.

5 Claims, 13 Drawing Figures

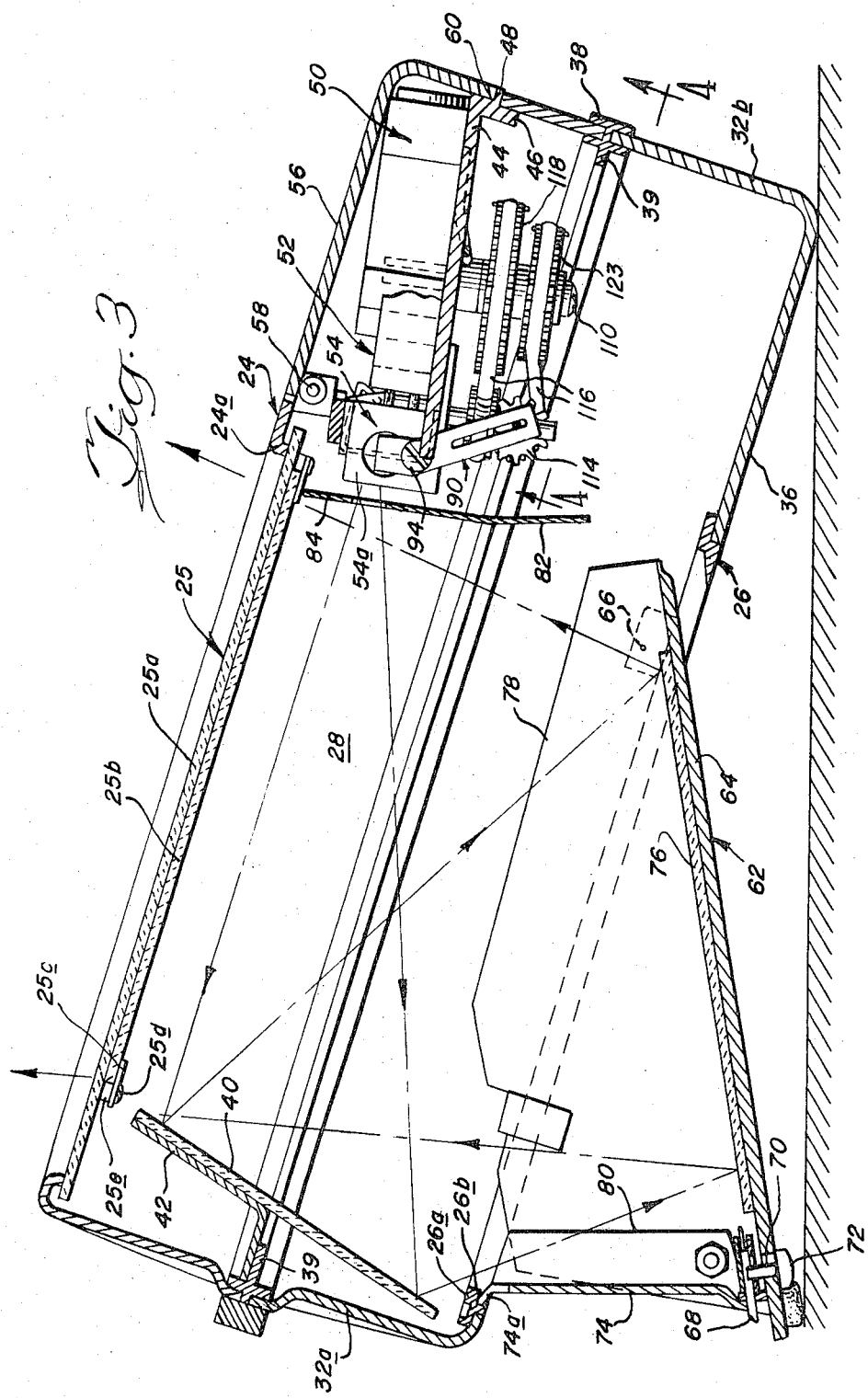

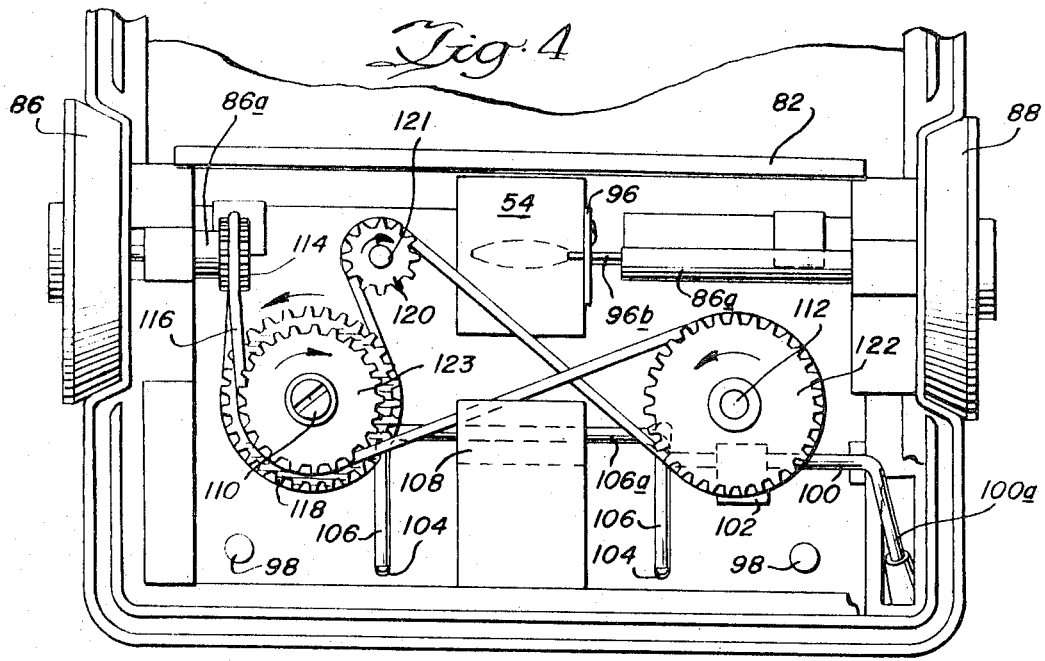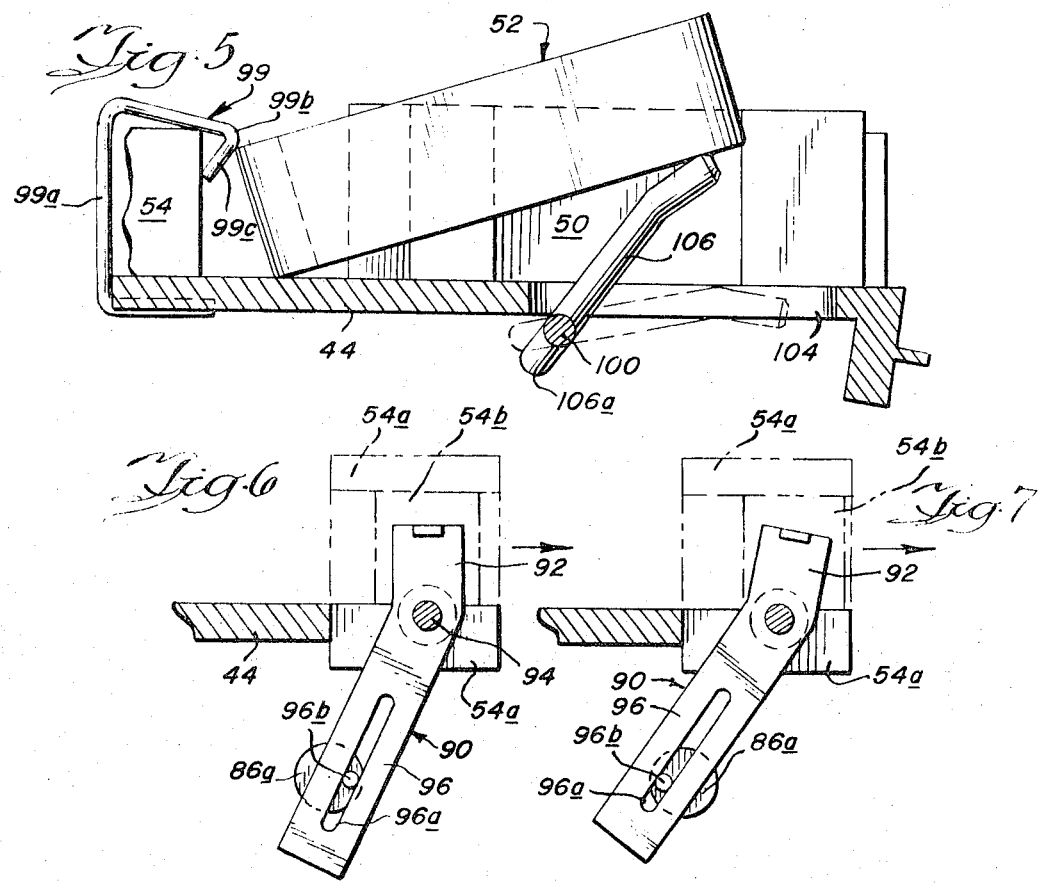

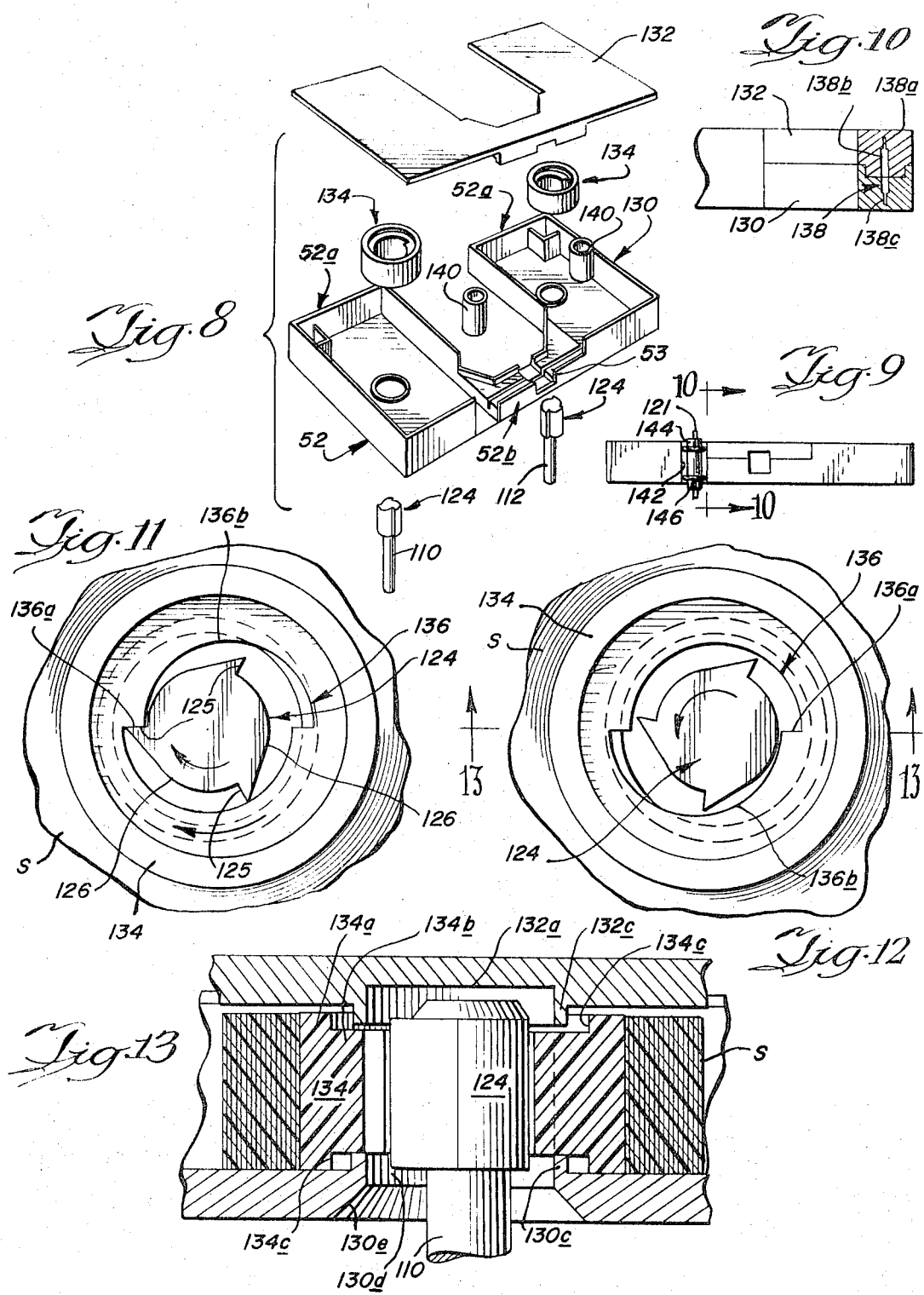

MICROFILM VIEWER

This is a division of application Ser. No. 90,514, filed Nov. 18, 1970.

BACKGROUND OF THE INVENTION

The use of microphotographs, printed on cards or on film-like cards known as fiche, and viewers for illuminating, enlarging and projecting selected frames of such cards or fiches onto a viewing screen are well known in the art. The prior art also informs one that in order to properly enlarge a microphotograph to a size for reading, the microphotograph must be located precisely at an attitude perpendicular to the optical axis of the optical system of the viewer. Scratching or damage to the microphotograph can seriously interfere with the projected image because of the requirement of substantial optical multiplying of size by the viewer. Because of the foregoing, viewers have heretofore been rather large, bulky and complex and required precise construction, resulting in a rather expensive instrument.

The use of cassettes for storage of taped sound recordings is also known in the prior art. Such cassette-stored tapes must present a length of flexible tape that is to be engaged by a head either for purposes of recording or playing. Because of the requirement that the flexible tape by engaged by a head, precision of alignment and spacing of the tape relative to the head and protection of the tape during transport does not constitute a major problem.

There exist numerous situations in which it would be advantageous to have a small portable viewing apparatus for microfilm that is housed within a cassette. For example, books could be microfilmed and stored in cassettes to form a library. A traveling salesman, or a mechanic, would not need to carry bulky catalogs and instruction manuals if the printed matter of such documents were stored in cassettes of microfilm, and if he had a small portable viewing apparatus for viewing selected frames of the film strip.

Thus, it is a major purpose of the present invention to provide a system for presenting written matter, such as documents, drawings or the like, on film strips enclosed in cassettes, and for providing a compact and inexpensive, but effective, viewer for reading microphotographs stored in cassettes.

It is another object of the present invention to provide a relatively small portable microfilm storing and viewing apparatus which can be easily carried from one place to another, is simple to construct and operate, and alleviates the need for carrying a burdensome amount of printed materials from one place to another.

It is a further object of the present invention to provide a cassette-stored microfilm system which can readily be used in offices and homes as well as at job sites, and which enables a large amount of printed matter to be stored in a small space without requiring the use of a cumbersome apparatus for viewing the matter.

ANother major purpose of the present invention is to provide in a storage cassette, for a film strip of microphotographs, features taht operate to precisely align the microphotograph that is being viewed with the optical system of a viewer, and which protect the microphotographs on the microfilm strip from inadvertent scratching or damage.

And a further object of this invention is to provide a novel drive for the selective transporting of a recording strip or tape within a cassette.

Further objects and advantages will become apparent from the detailed explanation of the invention that is provided in the following description and claims, and is illustrated in the accompanying drawings.

BRIEF DESCRIPTION OF THE DRAWINGS

FIG. 3 is an enlarged longitudinal cross-sectional view taken substantially along the line 3—3 of FIG. 1;

FIG. 4 is a fragmentary view showing the underside of the cassette-supporting platform, and is taken substantially on line 4—4 of FIG. 3;

FIG. 5 is a greatly enlarged cross-sectional view taken substantially on line 5—5 of FIG. 2 and showing features that cooperate with the cassette;

FIGS. 6 and 7 are greatly enlarged, fragmentary, longitudinal cross-sectional views, illustrating elements which effect changing the position and the lens means to vary the focus of the optical system;

FIG. 8 is an exploded perspective view of one form of cassette constructed in accordance with the principles of the present invention;

FIG. 9 is a front elevational view of a fragment of the assembled cassette of FIG. 8;

FIG. 10 is an enlarged, fragmentary, cross-sectional view taken substantially along line 10—10 of FIG. 9;

FIG. 11 is an enlarged, fragmentary, top plan view of a novel drive connection between the viewer and the cassette showing one of the driven hubs of the cassette surrounding a drive shaft, and wherein the shaft is rotating in a clockwise direction under influence of a controller;

FIG. 12 is a view similar to the view of FIG. 11, but showing the drive shaft rotating in the counter-clockwise direction; and FIG. 13 is a fragmentary cross-sectional view taken substantially along line 13—13 of FIG. 12 to illustrate certain construction features of the hub relative to the drive shaft and cassette.

DETAILED DESCRIPTION OF THE ILLUSTRATIVE EMBODIMENT

Figure 1:
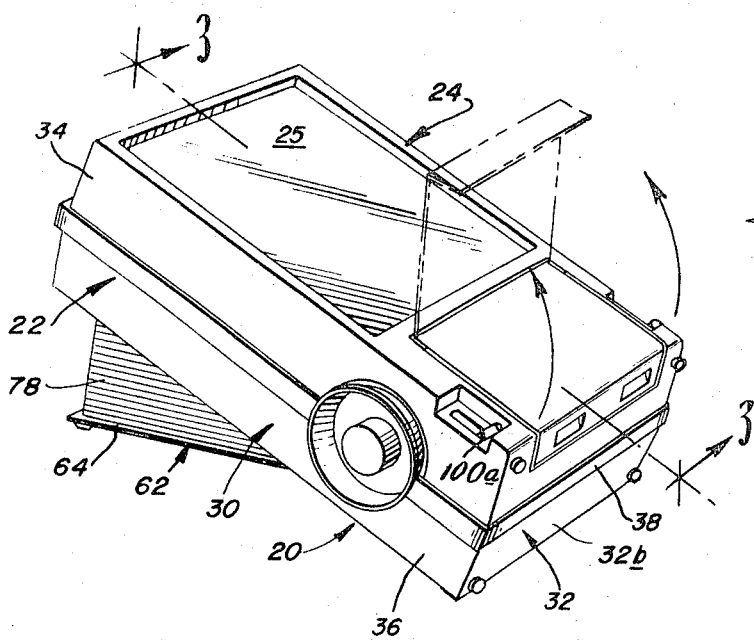
FIG. 1 is a perspective view of a microfilm viewer constructed in accordance with the present invention in its position of use and showing in phantom lines a cassette cover on the viewer in its raised, or open, position.

Referring now to the drawings, the microfilm viewer of this invention, generally indicated at 20, includes a casing means, or housing, 22 that is generally of rectangular box-like shape to provide upper and lower elongated sides, respectively, 24 and 26, that are spaced apart by side and edge portions, respectively, 30 and 32 to bound an elongated chamber 28 having distal and near ends adjacent, respectively, casing ends 32a and 32b. The precise construction of the respective walls and sides of housing means 22 is not critical, but in one preferred form it is proposed to provide same by two dished shell sections 34 and 36, molded of plastic and joined at their edges by an extruded joint 38 that provides peripheral recesses for receiving thereinto the edge of the shells, as indicated in FIG. 3, and also provides an inwardly-extending peripheral rib 39 to serve as a support where needed.

A major portion of the length of the casing's upper side 24 is occupied by viewing screen means, generally 25, that includes an outer, or upper, transparent plate 25a and a shorter, lower image-receiving-and-viewing plate 25b, that are held in position against an inturned edge 24a of side 24 by retainer 25c that are biased by screws 25d received in tapped studs 25e provided on the undersurface of the upper side 24. The lower plate 25b is a specially processed plate, as is known in the art, to serve as the screen against which the illuminated image is projected.

A first mirror 40 is provided in chamber 28 supported at an incline facing the lower side 26, by an angled mounting bracket 42 secured to rib 39. The lower edge of inclined mirror 40 is positioned closely adjacent the junction corner between lower side 26 and distal casing end 32a. The upper edge of mirror 40 is located outward of the distal edge of viewing screen 25b.

A support platform 44 is rigidly provided on casing 22 adjacent the casing's near end 32b by connectors including downturned flange 46 and out-turned rib 48. The platform 44 is located in chamber 28 between the near edge of viewing screen 25b and the casing's near end 32b, so as to leave the remainder of chamber 28 unobstructed for the purposes of the optical system of the viewer.

Mounted on platform 44 are spaced illuminating means 50 and lens means 54. A U-shaped cassette 52 with a microphotograph holding bight portion is located between the illuminating means 50 and the lens means 54. Beneath the platfrom 44 are a drive means for effecting selective transport of film within the cassette 52, a cassette-release means hereinafter described, and a control for selectively adjusting the position of the lens means 54. Spaced above platform 44 is a movable cover member 56 that is pivotally mounted adjacent one end at 58 and has a downturned edge 60 that is adapted to abut the upper side of rib 48 when the cover is closed.

The foregoing arrangement aligns the illuminating means 50, the microphotograph in cassette 52, and the lens means 54 so as to direct an enlarged illuminated image against the first mirror 40 in the manner as illustrated by the projection arrows seen in FIG. 3.

The housing's lower side 26 includes a stand-and-mirror means, generally 62, having an elongated stand member 64 pivoted adjacent its near end on pins 66 for movement between a stored position substantially in the plane of lower side 26 and an angled support position seen in FIG. 3. When in the angled support position with the far end of stand 64 and the near lower corner of the housing 22 engaging a horizontal support surface, the viewing screen 25b is located at an inclined attitude, as in FIGS. 1 and 3, convenient for scanning. The distal end of stand member 64 carries a latch member 68 that connects by pivot pin 70 to a manual control 72 to provide means to latchingly engage portion 26a of the lower side 26 when stand 64 is stored away. The distal end of stand 64 carries a pair of upstanding latches 74 spaced to straddle mirror 40 when in stored away position and of a selected length to locate stand 64 at a precise angle by torque portions 74a engaging shoulder 26b. The stand 64 carries on its inner or upper side a second elongated mirror 76 which is of a selected dimension to receive the entire image reflected from first mirror 40 and to project an enlarged reflection against the viewing screen 25b.

Three edge portions of stand 64 that are exposed when stand 64 is angled and that surround mirror 76 carry a pair of upright longitudinal light shields 78 and an upright end shield 80. The length of said lightshields is, as shown in FIG. 3, such as to be accepted in chamber 28 for storage and to extend at least to side 26 when the stand is angled, so as to inhibit intrusion of random light to chamber 28. An additional upright light shield 82 is provided in chamber 28 positioned forwardly of platform 44 and outwardly of the near end of viewing screen 25b, and is of a size to shield mirror 76 from random light produced by illuminating means 50. The shield 82 is apertured at 84 to permit optical projection therethrough of an illuminated image from lens means 54.

Figure 2:
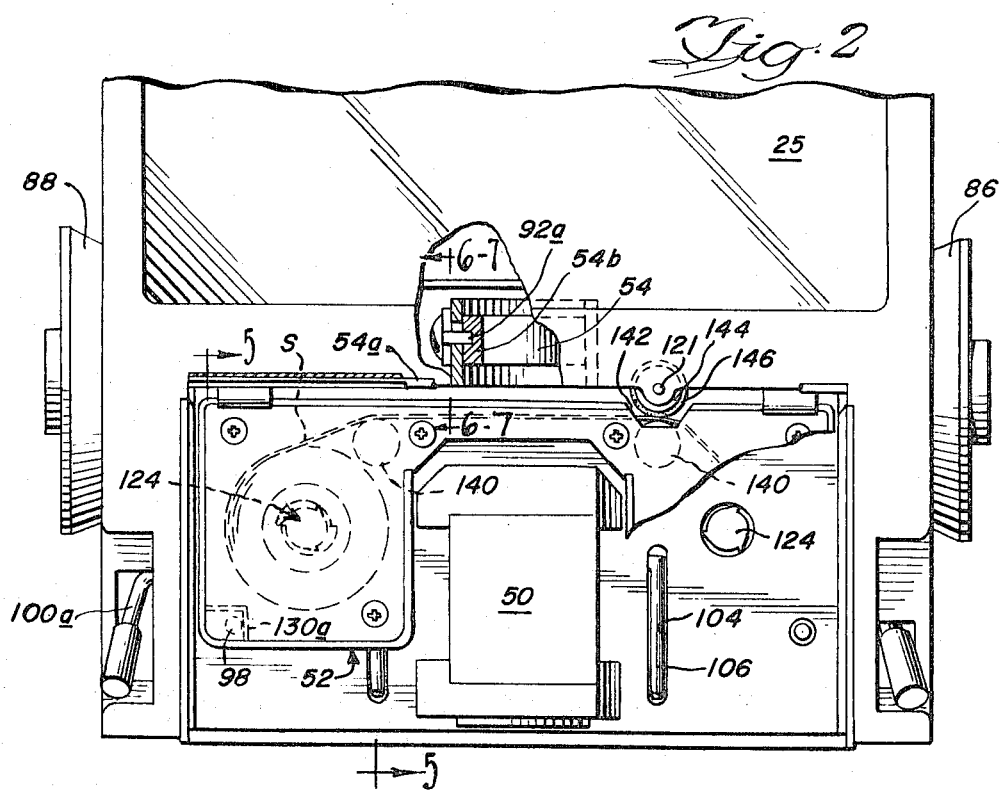
FIG. 2 is an enlarged, fragmentary top plan view with portions partially broken away, showing the cassette-receiving portion of the micro-film viewer of FIG. 1.

The viewer 20 is provided with similar rotatable controllers 86 and 88 located respectively adjacent the lateral edges of the casing on the right and left as seen in FIG. 2 and, respectively, arranged for selectively varying the focus of the projected image on screen 25b and for controlling and effecting transporting of the film strip in cassette 52. As seen in FIGS. 6 and 7, the lens means 54 includes an elongated, channeled support 54a that is rigidly secured to platform 44, so that the guide channel in which the movable lens cartridge 54b is slidable lies precisely parallel to the upper surface of platform 44. Movement of lens cartridge 54b is selectively effected through a control lever 90 having a short arm 92, extending upwardly of fulcrum pin 94 that is secured on platfrom 44, and a long arm 96 extending below platfrom 44. The short arm 92 connects by drive pin 92a to the lens cartridge 54b. The long arm 96 provides an elongated slot 96a that receives therein a driver pin 96b which projects eccentrically from the end of rotatable shaft 86a that is directly rotated by the controller 88.

It is important that the microphotograph that is to be projected and enlarged by the optical system be located within cassette 52 with precision relative to the lens cartridge 54b, because the optical system of the viewer is fundamentally an enlarger that operates to greatly magnify any distortions that may exist by reason of lack of precision. Thus, the lens cartridge 54b is movable, by reason of the foregoing construction, only longitudinally along the support 54a, and by structure now to be described the microphotograph that is to be projected will be located in a plane that is precisely perpendicular to the longitudinal axis of the lens means 54b.

The cassette 52 has a flat underside which is adapted to engage the upper surface of platform 44. In order to precisely position the microphotograph in cassette 52 square to, or perpendicular to both platform 44 and to the optical axis of lens 54b, the platform 44 is provided with a pair of abutment posts 98 perpendicular to the upper surface of platform 44 and adapted for engagement with portions of cassette 52. To insure that portions of cassette 52 are rigidly in abutment with platform 44 and upstanding abutment posts 98, a pair of spaced spring means 99 are provided carried by platform 44 and spaced from the posts 98. Each spring means 99 includes upstanding resilient arm 99a having a downwardly inclined portion 99b that projects towards parts 98, and a down-turned and turned back cam section 99c, as best seen in FIG. 5. The arm 99a is of greater height than the height of the cassette 52. The spring means 99 operates to impose a spring force that biases the cassette 52 firmly both longitudinally of platform 44 toward posts 98 and toward the upper surface of platform 44.

A means for releasing cassette 52 from abutment against posts 98 and the bias of spring means 99 is provided by an elongated fulcrum bar 100 which is shaped at one end to provide an angled actuator 100a that extends to a position where it may be manually manipulated by an operator. The fulcrum bar 100 is pivotly held against the underside of platform 44 by a strap-type journal retainer 102. A pair of apertures 104 are provided through platform 44 beneath portions of the cassette 52, so that a pair of levers 106 may be thust upwardly through such apertures to effect movement of cassette 52 to a release position as illustrated in FIG. 5. The levers 106 are arms of a U-shaped member whose bight 106a is offset from the pivot axis of fulcrum bar 100, so that said bight is positioned to move against the spring bias of a resilient return strap 108 mounted on the underside of platform 44. The spring 108 engaging bight 106a operates to normally restore the levers 106 to their normal position shown in broken lines in FIG. 5 when actuator 100a is released.

The microphotograph that is to be optically projected, by the structure hereinabove described, is carried by the cassette 52. In the preferred construction, the microphotograph being projected is only one of a series of microphotograph frames that are printed on an elongated film strip. Means are provided by the viewer and cassette for transporting the film strip within the cassette 52 so as to permit an operator to select the microphotograph that is to be projected. The cassette itself must be constructed to present the microphotograph at an attitude that is precisely perpendicular to the optical axis of the lens cartridge 54b for purposes of proper, undistorted, projection. What will now be described are the means for effecting transport of film within a cassette that is removably mounted relative to control means carried by the viewer, and the features of construction of the cassette itself that are provided for protectively storing and transporting the film strip, and for presenting a microphotograph of the film at the desired attitude for projection.

The drive means for effecting transport of film within the cassette 52 includes rotatable controller 86 that is provided for rotating a pair of spaced shafts 110 and 112 which extend through platform 44 and provide cassette-engaging portions at their upper ends. The controller 86 rotates a shaft 86a upon which is mounted a toothed drive wheel 114. A toothed, endless, flexible drive belt 116 is trained over drive wheel 114 and drivingly cooperates successively with: toothed wheel 118 that rotates with shaft 110, toothed wheel 120, toothed wheel 122 which rotates with shaft 112, toothed idling wheel 123 rotatable on shaft 110, and back to wheel 114. The shafts 110 and 112 are journaled in platform 44 for rotation. The wheel 120 may serve as an idling wheel, or alternatively may rotate a shaft 121 upon which is mounted a roller for a purpose hereinafter noted.

The upper portion of shafts 100 and 112 are each provided with a drive bit 124 that is shaped, as in FIGS. 2 and 8-10, to provide three arcuately spaced shoulders 125 that extend radially outwardly, and a cam edge 126 associated with each shoulder 125. Each cam edge 126 runs from the outermost tip of one drive shoulder 125 to the root or innermost edge of the following drive shoulder 125. As best seen in FIG. 2, the drive shoulders 125 on the drive bit on shaft 112 face counterclockwise, while the drive shoulders 125 on the bit on shaft 110 face clockwise.

It will be understood that both drive bits 124 will rotate simultaneously in the same direction when the controller 86 is rotated, and that by rotating controller 86 in an opposite direction, the direction of rotation of the bits are reversed. This means that when controller 86 is rotated in one direction the drive shoulders 125 on drive shaft 110 are adapted for driving connection with a clutch element on the cassette, but when the controller 86 is rotated in the opposite direction, the drive shoulders 125 on drive shaft 112 operate to effect a driving connection in the opposite direction.

The film-carrying cassette 52 is a generally U-shaped body having two spaced, film-spool housing sections 52a interconnected by a bight section 52b through which film is transported. As shown in FIG. 8, the cassette 52 is preferably formed of a molded plastic construction that includes a hollow or dished lower body section 130 and a cover plate 132. The outer corner of each spool section 52a, distal from bight 52b, is provided with an aperture 130a that is adapted to receive therethrough one of the two abutment posts 98. The inner corners of each cassette section 52a overlies one of the apertures 104 through platform 44.

The spaced upper and lower walls of each film-spool section 52a have annular centering rings 130c and 132c thereon which project toward the opposite wall. The bottom wall has an entry aperture 130d with a flared entry 130e concentrically of ring 130c, for accommodating entry of a drive bit 124. The cover plate, as best seen in FIG. 11, is provided with a recess 132a to accommodate entry of the tip of bit 124.

A spool, or reel, 134 for storage thereon of a coil of film strip S is located in section 52a, and provides an annular outer section 134a on which film is wound and an inner section 134b of reduced height to fit between centering rings 130c and 132c. The inner circular periphery 134c of the outer section 134a is of greater diameter than the diameter of centering rings 130c and 132c, so that the outer section 134a of each reel 134 is spaced some distance outwardly of the centering rings on the housing sections, as can be clearly seen in FIG. 11. This arrangement permits of a generalized centering of the reel 134 by the centering rings 130c and 132c, but permits of radial movement of the reel 134 relative to the said centering rings on the housing. Such radial movement is essential to the operation of the over-running clutch construction which permits a drive bit 124 to be rotated without driving the reel 134 as is illustrated in FIG. 10.

The inner periphery of the spool 134 is provided with a shape 136 tht is constructed for clutching or over-running cooperation with a driving bit 124. Thus, as seen in FIGS. 9 and 10, the periphery 136 includes three equally, arcuate, spaced radial shoulders 136a that are interconnected by cam surfaces 136b, each of said cams connecting the peak of one shoulder 136a with the root of a preceding shoulder 136a considering the direction in which the shoulders are to be driven.

The cassette 52 also provides means for positioning the film strips at a precise attitude perpendicular to the direction of optical projection. The film strip is desirably of 8 mm. width, and the microphotographs are printed or placed only in the central portion of the film strip, thereby leaving the longitudinal edges of the strip free to be engaged without effecting damage to the print. Cassette 52 provides an elongated channel 138 through the length of bight portion 52b. Channel 138 is of a height slightly greater than the 8 mm. width of the film strip. The bight 52b has a transverse window 53 therethrough which is of a selected size to fully expose the microphotograph frame on the film strip. As best seen in FIG. 12, channel 138 has spaced, elongated edge portions 138a and 138c of limited width and a central portion 138b of greater width. The width of grooves 138a and 138c is of the order of the thickness of the 8 mm. film strip so that the edge portions of the film strip will just slide through said grooves. Such an arrangement provides substantial rigidity to the 8 mm. film strip as it passes through channel 138, and such rigidity imparted to the film strip by the sliding cooperation with said grooves insures that the microphotograph frame that is disposed in alignment with window 53 is maintained precisely flat, without buckling or rippling, and thus the microphotograph is presented at a perpendicular attitude relative to the direction of optical projection of the image.

Mounted within cassette 52 adjacent the junction of each section 52a with bight section 52b is an idling roller 140 over which the film strip is trained before passing through the run of channel 138. Such rollers 140 eliminate sharp turns for the film strip. The microphotographs are normally located on the side of the strip opposite the one that passes over rollers 140. If required, the rollers 140 that engage the film strip may have spaced rim portions which engage only the longitudinal edges of the film strip.

In an optional modification of the drive for the film strip, an additional drive roller may be provided to grippingly cooperate with one of the idling rollers 140. To this end an aperture 142 is formed on the front side of cassette 52 adjacent one of the idle rollers 140, and an auxiliary roller 144 carried on or driven by shaft 121 is provided to engage portions of the outer side of the film strip. To protect the microphotograph on the outer side of the film strip, the auxiliary roller 144 is provided with spaced upper and lower film-engaging rings 146, such as rubber O-rings, which resiliently engage the film strip adjacent its longitudinal edges to air in transporting the film.

In connection with the film strip S and the channel 138 through which it is transported, it will be noted that a standard thickness of film is 0.0065 inches. In one form of construction, the width of grooves 138a and 138c was selected to be about 0.009 inches, and the width of central portion 138b was selected to be about 0.024 inches.

Although the drive for transporting the film is disclosed to be manual, it will be appreciated that a simple motorized drive for shaft 86a could be provided by means of a reversible electric motor that connects to shaft 86a through a speed reducing gear train, or the equivalent, and the direction of rotation of the motor could be controlled through a simple three-position toggle switch having opposite direction drive positions and an "off" position.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. In a cassette for a cassetted film strip of microphotographs that includes housing means for the film strip with transverse window means therein, a pair of spaced film spools in the housing means located on laterally opposite sides of the window means and adapted to be drivingly engaged by drive means exterior of the cassette, and film aligning means associated with each spool and mounted in the housing means between the spool and the window means and over which the film strip extending between the spools is trained; the improvement comprising, in combination: the housing means providing two film-spool housing sections spaced from each other and interconnected by an elongated bight, the transverse window means extending through the entire width of the bight, an elongated film-passageway means extending between and substantially tangentially of the two film aligning means and longitudinally through the bight and arranged perpendicularly to the transverse window means at the region of intersection of said film-passageway with the window means, said film-passageway being shaped to provide a central portion of greater width which intersects the window means and longitudinal film guideway portions of narrower width of the order of the thickness of a film spaced on opposite sides of the transverse window means and arranged to receive and guide only opposite longitudinal edges of the film strip and arranged to hold the film strip portion that is being projected through the window means substantially in a precise plane without buckling or waving of the central portion of the film strip, the housing means being provided by a unitary dished body section that defines a bottom and an upright peripheral wall, and a top cover plate; each film spool being an axially elongated body that provides along its entire length an outer periphery adapted to have the film strip wound therearound, said body section and cover plate being shaped and arranged to provide when secured together two hollow film-spool housing sections with portions of said body section and cover plate positioned closely adjacent both axial ends of the film spools to serve to help confine the film on the spools, and the body section and cover plate each also defining interfitting and telescoping bight portions that when fitted together define the bight of the housing means, each telescoping bight portion being shaped to provide both part of the transverse window means and part of the film passageway means.

2. A cassette as in claim 1 wherein centering means are provided on the housing means in each film-spool housing section, and at least one end of each film spool being provided with an axially depressed recess for receiving therein and positioning cooperation with the centering means.

3. A cassette as in claim 1 wherein each film aligning means includes roller means located within a film-spool housing section adjacent the junction of said film-spool housing section and an end of the bight.

4. A cassette as in claim 1 wherein at least one of the bottom and cover plate of the cassette is provided with annular centering means extending into each film-spool housing section, an aperture through the wall of the cassette and concentric with said annular centering means for each film-spool housing section of the cassette, and a film spool within each film-spool housing section and provided with an axially depressed aperture arranged for cooperation with the centering means to retain the spool in desired position within the film-spool housing section.

5. In a cassette for a cassetted film strip of microphotographs that includes housing means defining two film-spool housing sections spaced from each other and interconnected by an elongated bight having transverse window means through the width thereof, a pair of spaced film spools in the housing means located on laterally opposite sides of the window means and located at positions in which the spools are adapted to be drivinglyly engaged by drive means exterior of the cassette, and aligning means associated with each spool and mounted in the housing means between the spool and the window means and over which the film strip, that extends between the film-spools, is trained; the improvement comprising, in combination: the elongated bight being shaped and arranged to provide longitudinally therethrough an elongated film-passageway means that is separate from the film-spool housing sections and for confining the film strip substantially in a plane that is perpendicular to the window means at the intersection of said passageway means and the window means, said film-passageway means extending between and substantially tangentially of the two aligning means and being shaped to provide in cross-section a central longitudinal portion of greater width than the thickness of the film and longitudinal film-guideway portions of narrower width, in the order of slightly greater than the thickness of the film, said film-guideway portions being located on opposite sides of the transverse window means and being arranged to receive and guide only opposite longitudinal edges of the film strip and arranged to hold the film strip portion that is being projected through the window means substantially in a precise plane without buckling or waving of the central portion of the film strip, and the bight being defined by two interfitting and telescoping portions of said housing, each telescoping housing portion being shaped to provide part of the transverse window means and part of the film-passageway means.

* * * * *